United States Patent Office.

GUSTAVE BOURGADE, OF NEW YORK, N. Y.

Letters Patent No. 107,158, dated September 6, 1870.

IMPROVEMENT IN THE MANUFACTURE OF ALBUMEN.

The Schedule referred to in these Letters Patent and making part of the same.

*To all whom it may concern:*

Be it known that I, GUSTAVE BOURGADE, of the city and State of New York, have invented an Improvement in the Manufacture of Albumen; and the following is declared to be a correct description thereof.

My present invention is an improvement upon the invention heretofore made by me on the same subject, and on which a patent has been allowed to me.

I find that blood which has become partially putrid or fermented can be used to advantage, but I do not limit myself in this particular.

I introduce into the blood an alkaline solution of any desired character; it may be carbonate of ammonia, or slaked lime and spirits of ammonia, or slaked lime alone. The spirits of ammonia are especially required where fresh blood is used. From two to seven per cent. of the alkali is generally sufficient.

The liquid is poured into a closed or open vessel. When a closed vessel is used I distil in vacuum, so as to evaporate considerable of the aqueous portions. I prefer to employ a closed vessel and distil in vacuum, so that the evaporation may be rapid, and only a very low temperature be employed, say, from 160° to 175° Fahrenheit. In this manner from ten to thirty per cent. of water may be evaporated.

The spongy cake that remains after evaporation contains the albumen in a liquid condition, the other portions of the blood being sufficiently solidified to prevent their being pressed out with the albumen, when the mass is subjected to a powerful pressure in a bag, by a hydraulic or other press.

The albumen that is pressed out is of a clear gold color, but, in order to remove any foreign matter, I make use of from three-quarters of one per cent. to one and a half per cent. of an acid, (muriatic acid preferred,) the same being thoroughly mixed with the albumen, and then the liquid filtered in the presence of lime, to neutralize any free acid remaining. The lime may be in a bag suspended in the filter.

The albumen now free from odors and pure, or nearly so, is to be concentrated in any suitable drying apparatus; I prefer and use a vacuum-pan to concentrate the albumen, which can be done under a temperature of 125° to 150° Fahrenheit.

The albumen in its concentrated state is poured into pans and dried in a few hours, and is of a very light color, and superior to any albumen of commerce heretofore made.

In consequence of the use of ammonia, a greater yield of albumen than heretofore, can be obtained, especially from fresh blood. The ammonia aids in forming a perfect solution of the albumen with the water, so that when applied to fresh blood, there will be a larger proportion of albumen than heretofore.

The separation can be performed by filtration under vacuum action. A layer of fine willow charcoal, coal, or sand may be put upon the filter to advantage, and the cake remaining may be pressed by a hydraulic press or otherwise, to remove any albumen remaining. The albumen in this stage is mixed with considerable water, and is to be concentrated in a vacuum, as before.

When partially fermented or putrid blood is made use of, the yield is better; hence, fresh blood may be treated with pro. ox. azote, or other material to hasten fermentation.

When the said material is of the gaseous character named, it is to be forced into the blood, or pass thereinto as generated through a suitable tube.

The residuum in the press may be used as a fertilizer, after being ground or pulverized, or it may be employed for any other purpose to which it is available.

About twenty-five per cent. of this pulverized blood may be mixed to advantage with the fresh blood, to hasten the decomposition or separation of the albumen.

I claim as my invention—

1. The use of liquid ammonia in the separation of albumen from blood, by the process substantially as specified.

2. The employment of an acid in the purification of albumen, by the process and substantially as set forth.

3. The process herein specified for separating albumen from blood, and concentrating the same *in vacuo*.

Signed this 19th day of July, A. D. 1870.

GUST. BOURGADE.

Witnesses:
HAROLD SERRELL,
GEO. T. PINCKNEY.